(12) United States Patent
Ingrassia, Jr. et al.

(10) Patent No.: US 9,578,038 B2
(45) Date of Patent: *Feb. 21, 2017

(54) ELECTRONIC DEVICES HAVING ADAPTIVE SECURITY PROFILES AND METHODS FOR SELECTING THE SAME

(71) Applicant: Apple Inc., Cupertino, CA (US)

(72) Inventors: Michael I. Ingrassia, Jr., San Jose, CA (US); Jeffery T. Lee, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/174,571

(22) Filed: Feb. 6, 2014

(65) Prior Publication Data

US 2014/0157359 A1    Jun. 5, 2014

Related U.S. Application Data

(63) Continuation of application No. 13/100,851, filed on May 4, 2011, now Pat. No. 8,683,556.

(51) Int. Cl.
| | |
|---|---|
| *H04L 29/06* | (2006.01) |
| *H04W 12/08* | (2009.01) |
| *H04W 4/02* | (2009.01) |
| *G06F 21/70* | (2013.01) |
| *H04W 4/20* | (2009.01) |

(52) U.S. Cl.
CPC .............. *H04L 63/107* (2013.01); *G06F 21/70* (2013.01); *H04L 63/20* (2013.01); *H04L 63/205* (2013.01); *H04W 4/021* (2013.01); *H04W 12/08* (2013.01); *G06F 2221/2111* (2013.01); *G06F 2221/2113* (2013.01); *G06F 2221/2149* (2013.01); *H04L 63/108* (2013.01); *H04W 4/206* (2013.01)

(58) Field of Classification Search
CPC ............................. H04W 12/08; H04L 63/107
See application file for complete search history.

(56) References Cited

U.S. PATENT DOCUMENTS

| | | | |
|---|---|---|---|
| 6,216,007 B1 | 4/2001 | Havinis et al. | |
| 6,269,392 B1 * | 7/2001 | Cotichini | G06F 11/006 |
| | | | 709/200 |
| 6,300,863 B1 * | 10/2001 | Cotichini | G06F 11/006 |
| | | | 340/10.42 |
| 6,687,504 B1 | 2/2004 | Raith | |
| 7,177,426 B1 | 2/2007 | Dube | |

(Continued)

OTHER PUBLICATIONS

Perusco et al.; Control, trust, privacy, and security: evaluating location-based services; Published in: IEEE Technology and Society Magazine ( vol. 26, Issue: 1, Spring 2007 ); pp. 4-16; IEEE Xplore.*

(Continued)

*Primary Examiner* — Bradley Holder
(74) *Attorney, Agent, or Firm* — Morrison & Foerster LLP

(57) ABSTRACT

Adaptive security profiles are supported on an electronic device. One or more security profiles may be automatically or selectively applied to the device based on the device's location and one or more geographic zone definitions. The security profiles may be used to determine the level of authentication or number of invalid authentication attempts for a particular feature or application or set of features or applications.

39 Claims, 11 Drawing Sheets

(56) References Cited

U.S. PATENT DOCUMENTS

| | | | |
|---|---|---|---|
| 7,308,703 B2 | 12/2007 | Wright et al. | |
| 7,577,847 B2 | 8/2009 | Nguyen et al. | |
| 7,904,063 B1 | 3/2011 | Steelberg et al. | |
| 8,402,559 B2* | 3/2013 | Baum | H04L 61/2015 726/2 |
| 2005/0054438 A1* | 3/2005 | Rothschild | G07F 17/3239 463/29 |
| 2005/0233743 A1* | 10/2005 | Karaoguz | H04L 29/06027 455/432.3 |
| 2007/0200674 A1* | 8/2007 | Moore | G01C 21/26 340/5.74 |
| 2007/0255785 A1* | 11/2007 | Hayashi | G06F 17/30017 709/204 |
| 2008/0070593 A1* | 3/2008 | Altman | H04L 63/102 455/457 |
| 2008/0092160 A1* | 4/2008 | Mortimore | G06F 17/3089 725/34 |
| 2008/0147450 A1* | 6/2008 | Mortimore | G06Q 10/025 705/5 |
| 2009/0030878 A1* | 1/2009 | Weir | G06F 17/3089 |
| 2009/0098857 A1* | 4/2009 | De Atley | H04M 1/66 455/411 |
| 2009/0103722 A1* | 4/2009 | Anderson | H04L 9/0841 380/44 |
| 2009/0248807 A1* | 10/2009 | Fron | G06Q 10/00 709/206 |
| 2009/0254975 A1 | 10/2009 | Turnbull et al. | |
| 2010/0017874 A1 | 1/2010 | Piccinini et al. | |
| 2010/0109835 A1* | 5/2010 | Alrabady | H04L 63/107 340/5.2 |
| 2010/0175116 A1 | 7/2010 | Gum | |
| 2010/0245079 A1* | 9/2010 | Gudgel | G08B 25/10 340/539.13 |
| 2011/0067119 A1* | 3/2011 | Baum | H04L 61/2015 726/34 |
| 2011/0105073 A1 | 5/2011 | Hassan et al. | |
| 2011/0154434 A1 | 6/2011 | Hernacki | |
| 2011/0167440 A1 | 7/2011 | Greenfield | |
| 2011/0286459 A1* | 11/2011 | Rembarz | H04L 61/106 370/392 |

OTHER PUBLICATIONS

Tao et al.; Wireless LAN location-sensing for security applications; Published in: Proceeding WiSe '03 Proceedings of the $2^{nd}$ ACM workshop on Wireless security; 2003; pp. 11-20; ACM Digital Library.*

Ingrassia et al., U.S. Office Action mailed Aug. 13, 2013, directed to U.S. Appl. No. 13/100,851; 22 pages.

* cited by examiner

FIG. 4

ELECTRONIC DEVICES HAVING ADAPTIVE SECURITY PROFILES AND METHODS FOR SELECTING THE SAME

REFERENCE TO RELATED APPLICATIONS

This application is a continuation of Ser. No. 13/100,851, filed May 4, 2011, the entire contents of which are incorporated herein by reference.

FIELD OF THE INVENTION

Electronic devices having adaptive security profiles and methods for selecting the same are disclosed.

BACKGROUND OF THE DISCLOSURE

Portable electronic devices have become ubiquitous and continue to evolve to have an ever-expanding range of capabilities. It is not uncommon for a single device to perform multiple functions, including playing music, displaying video, storing pictures, sending and receiving email, receiving and transmitting phone calls, etc. Because of the portability of modern electronic devices, users often carry them wherever they go.

The increased convenience brought about by these devices is not without attendant perils. One potential downside, for example, is that unauthorized access to an electronic device may pose a dangerous security risk for a user. Users often have access to personal information (e.g., bank accounts, contact lists, and email) and confidential data (e.g., work related information) through their electronic devices that can be compromised in the event that the device is lost or stolen. One solution may be to provide password protection for each interaction between a user and his or her device, though frequent authentication may become onerous. Accordingly, what is needed are systems and methods for supporting various adaptive security profiles on an electronic device.

SUMMARY OF THE DISCLOSURE

Electronic devices that support various adaptive security profiles and methods for the selection thereof are disclosed. According to some embodiments, a method for supporting various adaptive security profiles may include maintaining a database that defines expected zones in which the electronic device may be located, obtaining a current location of the electronic device, determining whether the current location is located in, or near, one of the expected zones, and selectively applying one of a plurality of different security profiles based on the determination of whether the current location is located in, or near, one of the expected zones.

According to another embodiment, an electronic device for supporting various adaptive security profiles is provided. The device may include a location module operative to determine the location of the electronic device, a data storage device operative to store at least one expected zone and at least one security profile, and a processing module coupled to the memory and the location module. The processing module is operative to compare the determined location of the electronic device to the at least one expected zone and apply at least one electronic device security profile based on the comparison.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which:

FIG. 4 is an illustrative calendar based system for defining expected zones according to at least one embodiment;

DETAILED DESCRIPTION OF THE DISCLOSURE

Systems and methods for supporting various adaptive security profiles on an electronic device are provided and described with reference to FIGS. 1-7.

Figure 1:
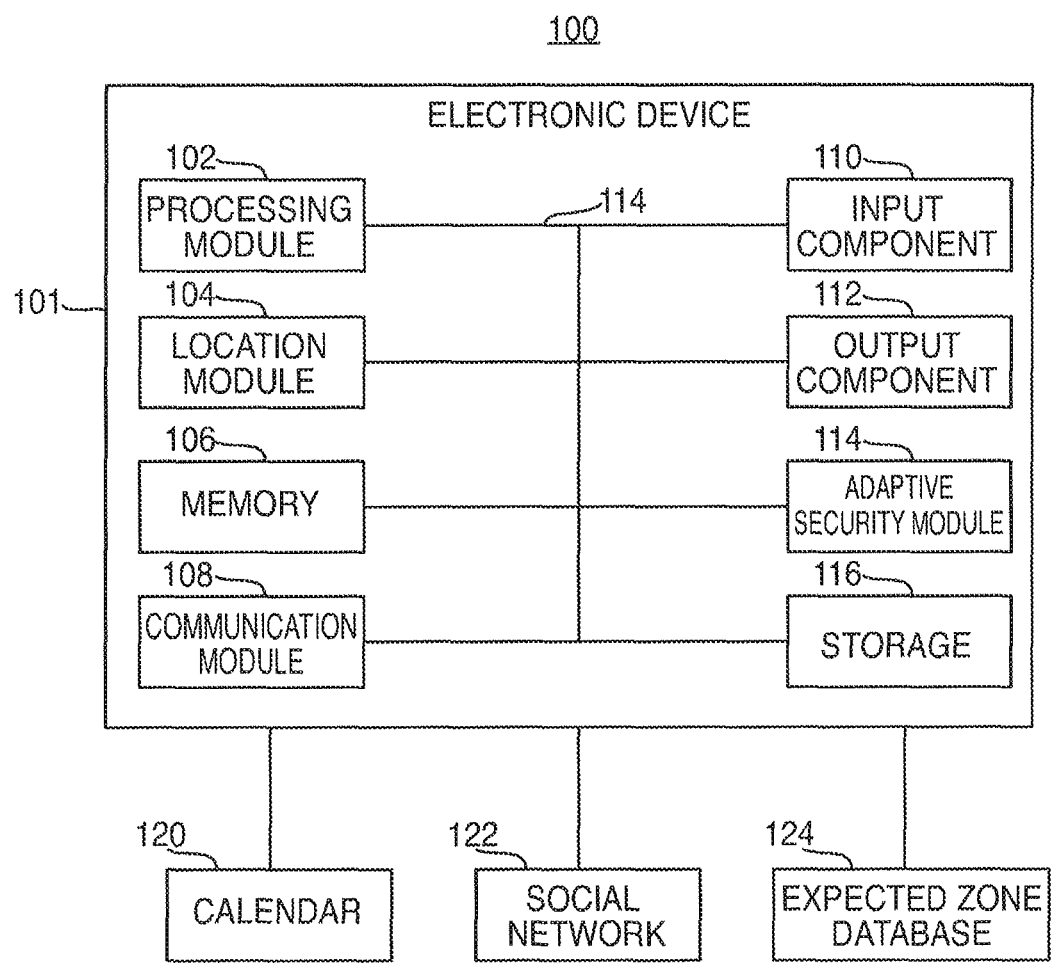
FIG. 1 is a schematic view of a system for supporting various adaptive security profiles according to at least one embodiment.

FIG. 1 is a schematic view of system 100 for supporting various adaptive security profiles. According to some embodiments, system 100 can include electronic device 101. Electronic device 101 may include, but is not limited to any device or group of devices, such as audio players, video players, music recorders, game players, other media players, music recorders, video recorders, cameras, other media recorders, radios, medical equipment, transportation vehicle instruments, calculators, cellular telephones, other wireless communication devices, personal digital assistants, programmable remote controls, pagers, laptop computers, desktop computers, printers, and combinations thereof. In some cases, electronic device 101 may perform multiple functions (e.g. play music, display video, store pictures, and receive and transmit telephone calls).

Moreover, in some cases, electronic device 101 may be any portable, electronic, hand-held, or miniature electronic device having a user interface constructed according to some embodiments that allows a user to use the device wherever the user travels. Miniature electronic devices may have a form factor that is smaller than that of hand-held electronic devices, such as an iPod™ available by Apple Inc. of Cupertino, Calif. Illustrative miniature electronic devices can be integrated into various objects that include, but are not limited to, watches, rings, necklaces, belts, accessories for belts, headsets, accessories for shoes, virtual reality devices, other wearable electronics, accessories for fitness equipment, key chains, and combinations thereof. Alternatively, electronic device 101 may not be portable at all, but may instead be generally stationary, such as a desktop computer or television.

Electronic device 101 can include, among other components, processing module 102, location module 104, memory 106, communication module 108, input component 110, output component 112, adaptive security module 114, storage 116, and bus 118. Components 102, 104, 106, 108, 110, 112, 114, 116, and 118 may all be part of electronic device 101 or, alternatively, individual components may be connected to electronic device 101 in any suitable manner.

For example, storage 116 may be a removable flash memory and location module 104 may be a GPS receiver that can be coupled to electronic device 101 by a cable (not shown). Processing module 102 may be connected to the other components of system 100 (e.g., via bus 118) to control and operate electronic device 101. In some embodiments, processing module 102 may execute instructions stored in memory 106. Processing module 102 may include, for example, one or more software or firmware applications, a microcontroller, and/or a microprocessor. Processing module 102 may also control input component 110 and output component 112.

In some embodiments, system 100 can include location module 104. Location module 104 may be any suitable component configured to determine the current location of electronic device 101. For example, location module 104 may be any one of, or a combination of, a global positioning system ("GPS") receiver, a WiFi (e.g., IEEE 802.11) antenna, or a cellular antenna. Such a location module may access, for example, a GPS application function call that returns the geographic coordinates of the device.

In addition, or as an alternative to being GPS-enabled, electronic device 101 may be able to determine its location using various measurements (e.g., signal-to-noise ratio ("SNR") or signal strength) of a network signal (e.g., a cellular telephone network signal) associated with the device. For example, a radio frequency ("RF") triangulation detector or sensor integrated with or connected to electronic device 101 may determine the approximate location of the device. The approximate location may be determined based on various measurements of the device's own network signal, such as: (1) the angle of the signal's approach to or from one or more cellular towers; (2) the amount of time for the signal to reach one or more cellular towers or the user's device; (3) the strength of the signal when it reaches one or more towers of the user's device; or any combination of the aforementioned measurements, for example. Other forms of wireless-assisted GPS (sometimes referred to as enhanced GPS or A-GPS) may also be used to access location information associated with an electronic device 101.

In some embodiments, a device may determine its location based on a wireless network or access point that is in range or a wireless network or access point to which the device is currently connected. For example, because wireless networks have a finite range, a network that is in range of the device may indicate that the device is located in the approximate geographic location of the wireless network.

Location module 104 may be connected to processing module 102 in order to determine, for example, a user's normal routine or whether electronic device 101 is in any particular zone such as an expected zone, trusted zone, or an un-trusted zone. An expected zone can be understood as a geographic area where a device expects itself to be, the boundaries of which may be determined by any suitable method. In general, a particular expected zone can be defined by geographic location, time, association with a particular network, association with a RFID tag, association with other networked devices (e.g., association with one or more electronic devices over the Bluetooth™ protocol), and any combinations of the above. Trusted zones can be subsets of the set of defined expected zones and may be appropriate when a user can be highly confident that the device is not being used by an unauthorized person. An un-trusted zone can be defined as all zones that do not correspond to any defined expected zones. Location module 104 can be implemented as hardware only, or may include one or more software or firmware applications. In some embodiments, location module 104 may be integrated into electronic device 101. In other embodiments, location module 104 can be a separate device configured to communicate with electronic device 101 (e.g., using Bluetooth™ communication or a wired interface).

Memory 106 can include one or more different types of memory that can be used to perform device functions. For example, memory 106 may include one or more of several caches, flash memory, RAM, ROM, and/or hybrid types of memory.

Storage device 116 may include one or more suitable storage mediums or mechanisms, such as a magnetic hard drive, flash drive, tape drive, optical drive, permanent memory (e.g., ROM), or cache. Storage device 116 may be used for storing assets, such as audio and video files, text, pictures, graphics, contact information, or any other suitable user-specific or global information that may be used by electronic device 101. Storage device 116 may also store programs or applications that can run on processing module 102, may maintain files formatted to be read and edited by one or more of the applications, and may store any additional files that may aid the operation of one or more applications (e.g., files with metadata). In some embodiments, storage 116 may include some memory components that are fully integrated into electronic device 101, removably integrated into electronic device 101, or separate from electronic device 101. In the latter case, a separate storage component may be configured to communicate with electronic device 101 (e.g., using Bluetooth™ communication or a wired interface). It should be understood that any of the information stored on storage device 116 may instead be stored in memory 106 and vice versa.

Electronic device 101 may also include input component 110 and output component 112 for providing a user with the ability to interact with electronic device 101. For example, input component 110 and output component 112 may provide an interface for a user to interact with an application running on processing module 102. Input component 110 may take a variety of forms including, but not limited to, a keyboard/keypad, trackpad, mouse, click wheel, button, stylus, microphone, touch screen, or combinations of the foregoing. Input component 110 may also include one or more devices for user authentication (e.g., a smart card reader, fingerprint reader, or iris scanner) as well as an audio input device (e.g., a microphone) or a visual input device (e.g., a camera or video recorder) for recording video or still frames. Output component 112 may include a liquid crystal display ("LCD"), a touch screen display, speaker, or any other suitable system for presenting information or media to a user. Output component 112 may be controlled by processing module 102, which can include, for example, one or more software applications and a video card, such as a video card with 2D, 3D, or vector graphics capabilities. In some embodiments, output component 112 may also include an audio component that is remotely coupled to electronic device 101. For example, output component 112 may include a headset, headphones, or earbuds that may be coupled to electronic device 101 with a wire or wirelessly (e.g., Bluetooth™ headphones or a Bluetooth™ headset).

According to some embodiments, input component 110 may receive information suitable to determine the location of electronic device 101. Input component 110 may, for example, include a microphone that can sample the environment for a particular soundscape. A soundscape may be the sound or combination of sounds in a particular environment. In some embodiments, the soundscape can operate as an audible fingerprint of that location. For example, the user's home and workplace may have distinct soundscapes that can be sampled by input component 110 to verify the location of electronic device 101. According to some embodiments, soundscapes may be used when other location determining features (e.g., GPS) are unavailable. In some embodiments, soundscape sampling may provide the only means of determining the location of electronic device 101. In other embodiments, soundscape sampling may be used in conjunction with other location determining features (e.g., those associated with location module 104).

Electronic device 101 may have one or more applications (e.g., software applications) stored on storage device 116 or in memory 106. Processing module 102 may be configured to execute instructions of the applications. For example, processing module 102 may be configured to execute a media player application that causes full-motion video or audio to be presented or displayed on output component 112. Other applications resident on electronic device 101 may include, for example, a telephony application, a GPS navigator application, a web browser application, a calendar or organizer application, or an email client. Electronic device 101 may also execute any suitable operating system, and can include a set of applications stored on storage device 116 or memory 106 that is compatible with the particular operating system.

The applications available to a user of electronic device 101 may be grouped into application suites. The suites may include applications that provide similar or related functionalities. For example, the applications in one suit may include word processing and publishing applications (e.g., Keynote™ and Pages™ within the iWork™ suite available by Apple Inc.), and another suite may include media editing tools (e.g., iWeb™ within the iLife™ suite available by Apple Inc.). The applications within a given suite may have similar properties and other features that associate each application in a suite with the other applications in that suite. For example, the applications may feature a similar look and feel, may include a similar user interface, may include related features or functions, may allow a user to easily switch between the applications in the suite, or may include any suitable combination of the foregoing.

Although some embodiments are generally described in terms of a single application, it should be understood that any of the features or functionalities of an application may be general to one or more of the applications in a suite. Alternatively, they may be general to one or more applications across a group of suites. A user may, according to some embodiments, desire that one or more applications or suites of applications remain secure from access by an unauthorized user. In those and other embodiments, the user may be able to define a number of security profiles that can control access to those applications or suites of applications. In general, at least one of the defined security profiles may be applied automatically based on whether electronic device 101 is in an expected zone. For example, when electronic device 101 is not in an expected zone, access to certain applications or suites of applications may require a more secure authentication method or access may be denied altogether.

In some embodiments, system 100 may include communications module 108, which is operable to connect to one or more communication networks. Communications module 108 can be any suitable module operative to connect electronic device 101 to a communications network and receive and/or transmit communications (e.g., voice or data) to and/or from other devices or systems within the communications network. Communications module 108 may be operative to interface with the communications network using any suitable communications protocol including, but not limited to, Wi-Fi™ (e.g., a 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), global system for electronic communications ("GSM"), enhanced data rates for GSM evolution ("EDGE"), code division multiple access ("CDMA"), quadband, and other cellular protocols, voice over Internet protocol ("VOIP"), hypertext transfer protocol ("HTTP"), BitTorrent, file transfer protocol ("FTP"), rapid transport protocol ("RTP"), real-time streaming protocol ("RTSP"), secure shell protocol ("SSH"), rich site summary or really simple syndication protocol ("RSS"), or any other suitable communications protocol, or any combination thereof.

In some embodiments, communications module 108 may be operative to create a communications network using any suitable communications protocol. For example, communications module 108 may create a short-range communications network using a short-range communications protocol to connect to other devices or systems. For example, communications module 108 may be operative to create a local communications network using the Bluetooth™ protocol to couple with a Bluetooth™ headset. Communications module 108 may also include a wired or wireless network interface card ("NIC") configured to connect to the Internet or any other public or private network. Communications module 108 may also include one or more software applications. For example, electronic device 101 may be configured to connect to the Internet via a wireless network, such as a packet radio network, an RF network, a cellular network, or any other suitable type of network. Communications module 108 may be used to initiate and conduct communications with other communications devices or media players or systems within a communications network.

Electronic device 101 may also include any other component suitable for performing a communications operation. For example, electronic device 101 may include a power supply, an antenna, ports or interfaces for coupling to a host device, a secondary input mechanism (e.g., an ON/OFF switch), or any other suitable component. Communications module 108 can also include circuitry that enables electronic device 101 to be electrically coupled to another device (e.g., a computer or an accessory device) and communicate with that other device.

Various adaptive security profiles can be supported on an electronic device (e.g., electronic device 101) in accordance with some embodiments. For example, a user may define a number of distinct security profiles to correspond to particular situations (e.g., whether the electronic device is in an expected zone). In some embodiments, a security profile can control access to various functions and features of electronic device 101, including, but not limited to turning the device on and off, waking the device up from a sleep mode, accessing one or more applications, altering device settings, changing passwords or security profiles, playing or viewing media files, installing applications and uninstalling applications, accessing calendars, accessing contact lists, making phone calls, and accessing email clients. Each individual security profile may generally control the type and strength of authentication necessary to access each available function and feature on the electronic device. As part of a typical security profile, a user may be free to set access provisions for at least the functions and features above. For example, a user may decide that access to particular files (e.g., confidential information) should always require authentication, while access to personal email should only require authentication when electronic device 101 is not in an expected zone.

According to some embodiments, communications module 108 can connect to a network that includes one or more of a user's other network-capable devices. For example, a user may carry a RFID tag in a secure location on, in, or around, the his or her body so that whenever electronic device 101 is within a predetermined distance from the RFID tag, a RFID reader, as part of communications module 108, can read the tag and establish an expected or trusted zone. Similarly, electronic device 101 may, according to some embodiments, pair with one or more network-capable devices (e.g., with the Bluetooth™ protocol). If electronic device 101 is paired with one or more of a user's other devices an expected or trusted zone may be established. Expected or trusted zones established in this manner may, according to some embodiments, last for a predetermined length of time or until the network connection is broken.

System 100 can also include a calendar 120, a social network 122, and an expected zone database 124. System components 120, 122, and 124 may reside locally in memory 106 and/or storage 116 or they may be stored remotely. In the embodiments where components 120, 122, and/or 124 are available remotely, communication module 108 may be employed to communicate with those components. Calendar 120 and social network 122 (discussed more fully with respect to FIG. 4 below) may generally contain information suitable to define one or more expected zones. For example, a calendar entry that includes geographic and temporal information regarding a particular event may be used to define an expected zone associated with that event.

In some embodiments, defined expected zones may be stored in expected zone database 124. Similar to system components 120 and 122, expected zone database 124 may be stored locally (e.g., in memory 106 and/or storage 116) and/or remotely. Expected zone database 124, according to some embodiments, can store a number of expected zones, which can include information about the geographic and temporal boundaries associated with a particular expected zone along with other useful data, such as the method used to determine the boundaries of an expected zone. In general, a particular expected zone can be defined by geographic location, time, association with a particular network, association with a RFID tag, association with other networked devices (e.g., association with one or more electronic devices over the Bluetooth™ protocol), and any combinations of the above. Expected zone database 124 may store information on any number of defined expected zones.

An expected zone can generally be defined as a geographic area where a device expects itself to be, the boundaries of which may be determined by any suitable method. For example, because most people tend to follow the same routine every day the electronic device (e.g., electronic device 101 of FIG. 1) can determine, from the user's routine, where the user is expected to be on a certain day and time. Electronic device 101 may be able to "learn" a user's routine using, for example, location module 104 and one or more applications running on processing module 102. An expected zone defined in this manner can be stored in an expected zone database 124.

As another example, a user may be able to define one or more expected zones based on any suitable geographic and/or temporal boundaries. In this approach, the user may be prompted to enter expected zone boundaries into a map application, for example. Alternatively or additionally, the user may define the boundaries using a standard geographic coordinate system. Boundaries may also be automatically determined by drawing a circle of a predetermined radius from a particular location. According to some embodiments, expected zones may be static (i.e., constant with respect to time) or dynamic (i.e., expected zones may fluctuate with date, time, day of the week, and/or change in routine). For example, a user may follow one particular routine on weekdays and another on weekends. In that case, one expected zone could be defined to cover the location that the device normally is from Monday-Friday, and another expected zone could be defined to cover the location that the device normally is on Saturdays and Sundays.

In some embodiments, a particular expected or trusted zone may be based upon establishing a connection to a particular network. For example, in some embodiments, electronic device 101 may connect to a wireless network that is in range. If a network identifier associated with that network (e.g., the service set identifier ("SSID") of a Wi-Fi network) matches a list of expected or trusted network identifiers in a user's database (e.g., expected zone database 124), a particular security profile may be applied to electronic device 101 while the device is in the range of, and/or connected to, that network. In some embodiments, geographic coordinates may not be defined for each zone. Rather, an entry and exit from an expected zone may be used. A device may, for example, enter an expected zone when it crosses a first wireless network and exit the expected zone when it crosses a second wireless network.

As described above, the electronic device may be configured to communicate with a RFID tag or other device over a personal network. For example, a user may carry a RFID tag in a secure place on his or her body. An expected zone can be defined for the instances that the electronic device senses (e.g., with communications module 108) that it is within a predetermined distance from the RFID tag. A similar approach can be used when the electronic device connects to other devices in a personal network. For instance, a user may carry one or more additional Bluetooth™ enabled devices. An expected zone can be defined for the instances that the electronic is connected to at least one of those devices. The electronic device may also monitor the soundscape of the environment to define an expected zone.

One or more zones may co-exist with (or partially overlap) other zones. Overlapping zones may be of the same type (e.g., both expected zones) or different types (e.g., an expected zone or a trusted zone). For example, a user's home may be designated as a trusted zone while the user's entire neighborhood is defined as an expected zone. Each zone may be associated with one or more security profiles. When two or more zones co-exist with one another, the application of one or more security profiles may create a conflict in accordance with some embodiments. For example, a security profile for a trusted zone may be more lax than a security profile for an expected zone. Because an electronic device may not be able to apply multiple security profiles at the same time, zones may be assigned zone priorities. Zones with higher zone priorities may preempt zones with lower zone priorities (or zones without a zone priority assigned). In some embodiments, any zone designated as a trusted zone may be given priority over a zone designated as an expected zone. In addition, zone priorities may be established when an expected or trusted zone is defined or zone conflicts may be handled in real time. For example, when a zone conflict arises, the electronic device may prompt the user to decide which security profile to apply. Because of the risk of an unauthorized user taking advantage of such a choice in order to apply a more lax security profile, choosing to apply a particular security profile may, according to some embodiments, always require user authentication.

Figure 2:
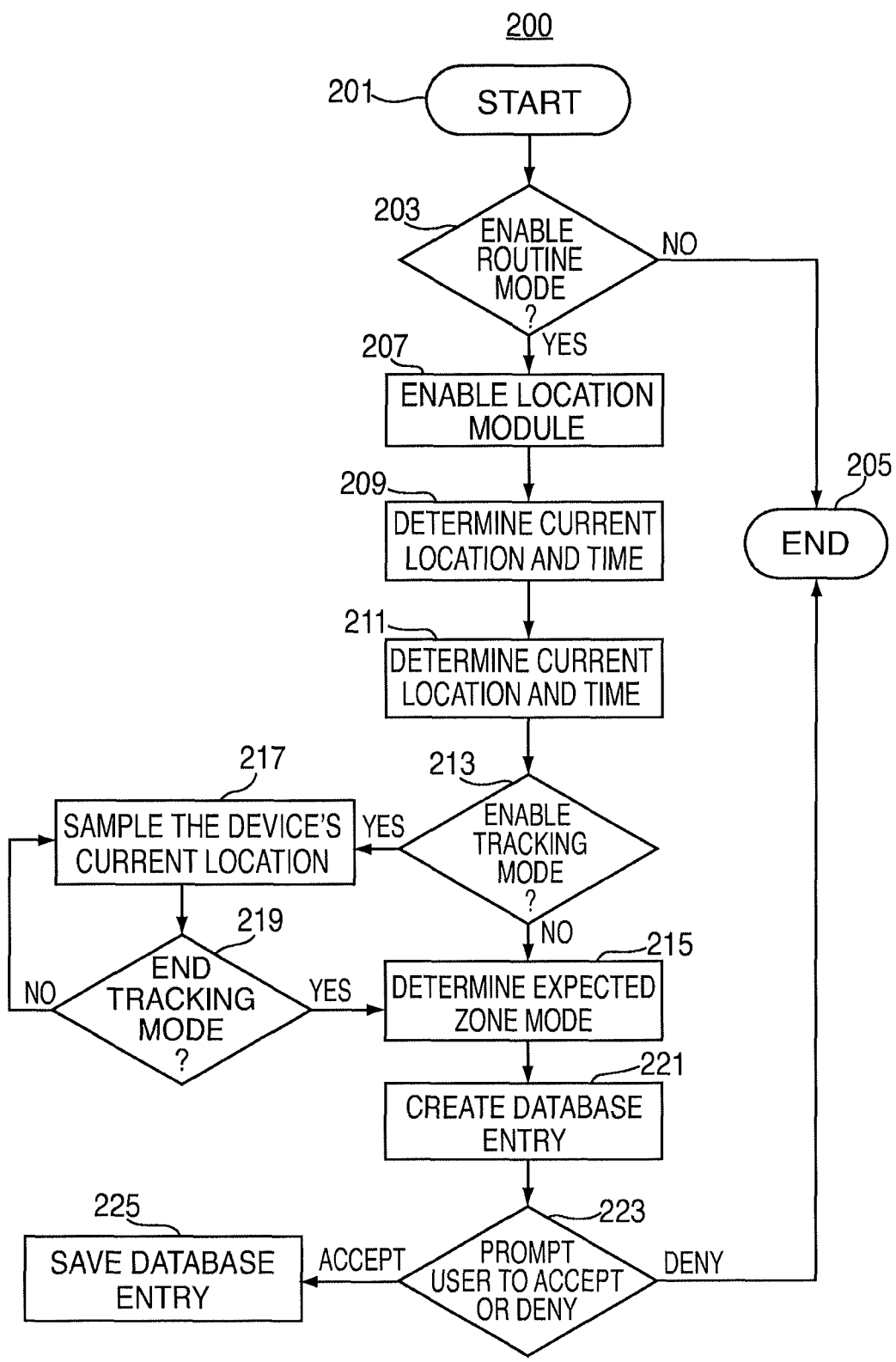
FIG. 2 is a flowchart of an illustrative method for defining and saving expected zones according to at least one embodiment.

FIG. 2 is a flowchart of illustrative method 200 for defining and saving an expected zone. Method 200 can start at step 201. At step 203, the device can prompt the user to enable routine mode. In general, a routine mode can be any mode in which the electronic device can determine the device's location and, based at least on the determined location, define an expected zone. If routine mode is not enabled at step 203, method 200 can end at step 205. If routine mode is enabled at step 203, method 200 can proceed to step 207 in which a location module (e.g, location module 104 of FIG. 1) can be enabled. Once the location module is enabled, the electronic device can determine the current time and its location.

At step 213, the device can prompt the user to enable tracking mode. If the user chooses not to enter tracking mode at step 213, method 200 can proceed to step 215 in which the device can enter expected zone definition mode. In the expected zone definition mode a user may decide how to define an expected zone based on the time and location information gathered at step 211 (or in steps 217 and 219 discussed below). For example, the user may choose to define the geographic boundary of the expected zone at a particular distance from the device's location as determined in step 211. The user may also associate a certain timeframe with the expected zone. An exemplary expected zone defined in this way could be the geographic area within a one-mile radius of the geographic location determined in step 211 from the hours of 9 am-10 am Monday through Friday.

If the user chooses to enable tracking mode at step 213, method 200 can proceed to step 217. At step 217, location module 104 can sample the device's current location. After the device's location is sampled, method 200 can proceed to step 219 to determine whether the user has decided to end tracking mode. If, after a predetermined time (e.g., one second) the device determines that the user has not chosen to end tracking mode, method 200 can return to step 217 and again sample the device's current location. Steps 217 and 219 can loop until the user decides to end tracking mode (e.g., with input component 110).

Once the user decides to end tracking mode at step 219, method 200 can proceed to step 215, in which the device can enter expected zone definition mode. When the electronic device enters expected zone definition mode from step 219 it can use the location data sampled at step 217 to define the geographic boundaries of the expected zone. For example, an expected zone defined in this way can include all locations within a predetermined distance of each location sampled at step 217. If the predetermined distance is greater than the maximum distance between any two location samples, the defined expected zone may be a contiguous geographic region around the path traveled by the device while the device was in tracking mode. At step 215, the user can also define temporal boundaries for the zone.

After the user defines an expected zone in step 215, method 200 can proceed to step 221 in which the device can create an expected zone database entry. An expected zone database entry can contain all of the requisite information associated with a particular expected zone. For example, an expected zone database entry can contain geographic and temporal boundaries for an expected zone.

Method 200 can then proceed to step 223 in which the user can be prompted to accept or deny the newly defined expected zone. If the user chooses to deny the newly created zone, method 200 can proceed to step 205 and end without saving the expected zone to the expected zone database. However, if the user is satisfied with the newly created expected zone, the user can accept the expected zone at step 223. If the user accepts the expected zone, method 200 can proceed to step 225 in which the expected zone database entry can be saved to the expected zone database.

In some embodiments, a user may choose to define the geographic boundaries of an expected zone using a mapping application rather than with the location determining method described above. In those embodiments, method 200 may begin at step 215 in which the user can use a mapping application to define the boundaries of an expected zone in any suitable manner. For example, the user may trace the outline of a desired expected zone on a map, enter geographic coordinates that define the center of the desired expected zone, or enter the town, city, county, etc. associated with the desired expected zone. After the expected zone is defined in this manner, method 200 can proceed to step 221.

At step 215, a user may also be able to determine the type of expected zone to define. For example, the user can determine that whenever the device is in that particular zone, it is very likely in a secure location. In that case, the user can label the expected zone as a "trusted zone." If the user can be fairly sure that the device is secure when it is in the expected zone it can simply label the zone as an "expected zone." These zone types can later be associated with a particular security profile. So, for example, defined expected zones that are labeled as trusted zones may have more lax authentication requirements than those labeled as expected zones.

In some embodiments, expected zones can be created automatically and entered into expected zone database 124. For example, the electronic device may automatically take periodic samples of the device's location along with, in some embodiments, the date, day of the week, and time. An application running on processing module 102 can be configured to look for patterns in the sampled time and location data and based on at least the recognized patterns, create expected zones and save them in expected zone database 124. In some embodiments, the device may prompt the user with questions that can be used to calibrate these auto-generated expected zones. Some embodiments may require the user to approve an auto-generated zone before it is entered into expected zone database 124. In other embodiments, however, the auto-generated zones can be entered into expected zone database 124 automatically.

It is to be understood that the steps shown in method 200 of FIG. 2 are merely illustrative and that existing steps may be modified or omitted, additional steps may be added, and the order of certain steps may be altered.

Figure 3A:
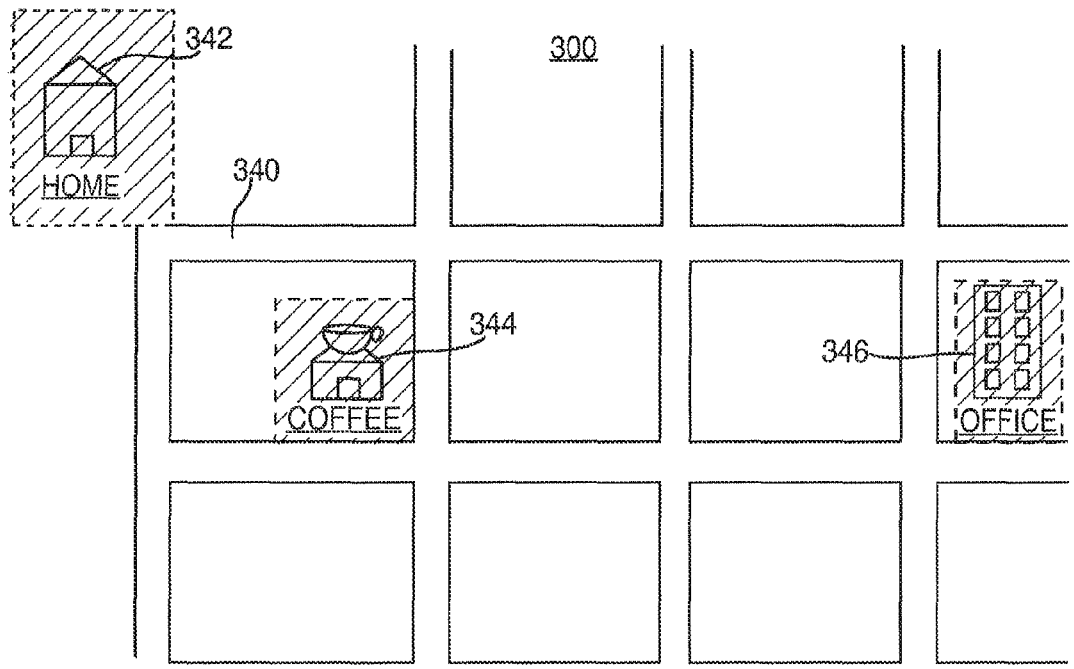
FIGS. 3A-C show illustrative expected zones in accordance with various embodiments.

FIG. 3A is an illustrative geographic area 300 in accordance with various embodiments. Geographic area 300 may include expected zones 340 (i.e., the shaded portion of geographic area 300), home 342, coffee shop 344, and office 346. Geographic area 300 may be, for example, a user's neighborhood. Expected zone 340, according to some embodiments, could be the route that the user follows during his or her daily routine. In this case, a user may leave home 342, proceed to coffee shop 344, and arrive at office 346. The individual places, as well as the route between the places, can be defined as one continuous expected zone 340. As described above, an electronic device (e.g., electronic device 101) may be able to determine expected zone 340 using, for example, processor 102 (including an application loaded thereon) and location module 104. A user may also be able to delineate the boundaries of expected zone 340 using a map application, or using coordinates of a standard geographic coordinate system (e.g., the World Geodetic System 1984 ("WGS 84") standard). Any other suitable standard may also be used to define geographic coordinates in other embodiments. These standards may utilize any suitable reference system and any suitable reference ellipsoid. Additionally, a user may be able to designate one or more of the places (e.g., home 342, coffee shop 344, and/or office 346) or sections of expected zone 340 as one or more "trusted zones." A particular trusted zone may be, according to some embodiments, a subset of a defined expected zone.

Figure 3B:
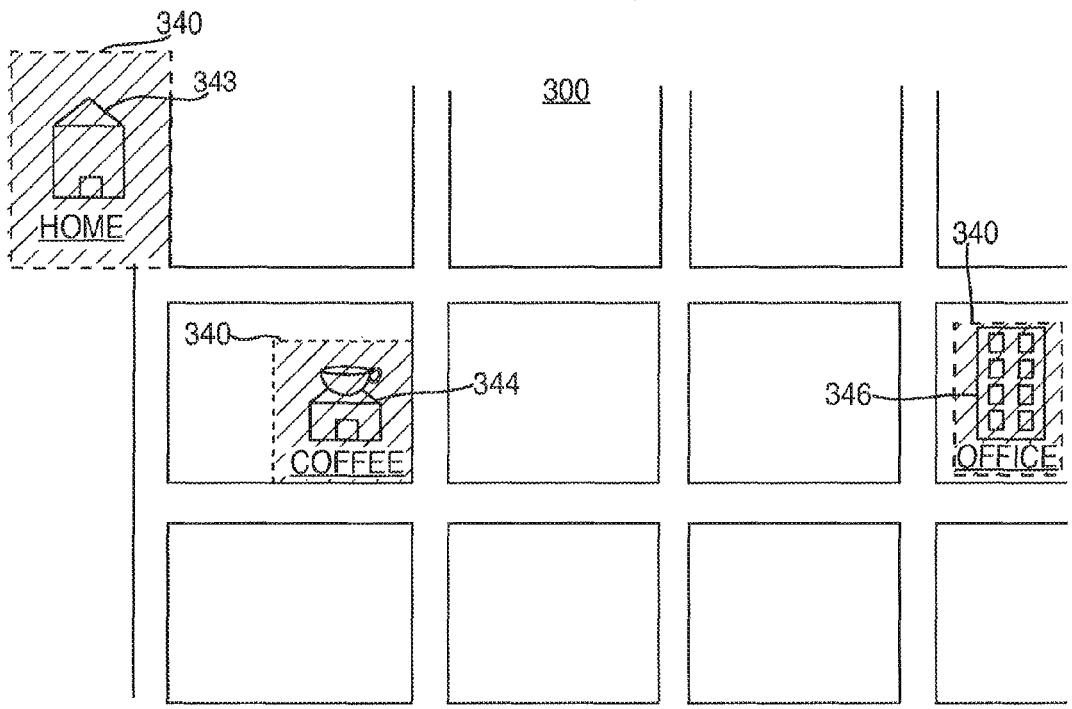

FIG. 3B is an illustrative geographic area 300 in accordance with various embodiments. Geographic area 300 may include expected zones 340. In these and other embodiments, expected zones 340 may be a set of discontinuous geographic areas. For example, expected zones 340 may be defined as the geographic areas comprising a small area surrounding each of home 342, coffee shop 344, and office 346. Expected zones 340 may be determined by any of the approaches listed above, or any other suitable approach. In some embodiments, one or more of the discontinuous areas of expected zones 340 may be designated as a trusted zone.

Figure 3C:
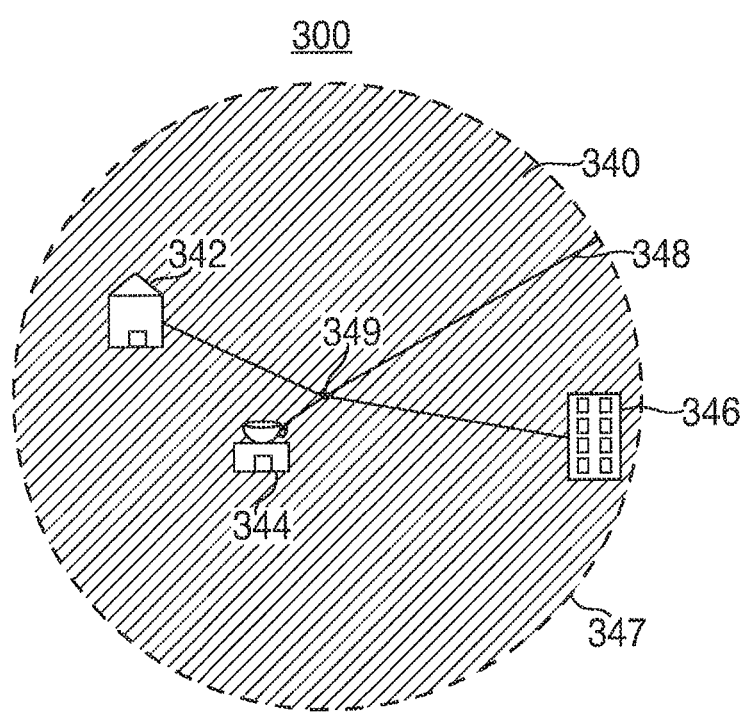

FIG. 3C is an illustrative geographic area 300 in accordance with various embodiments. Geographic area 300 may include expected zone 340. In these and other embodiments, boundary 347 of expected zone 340 can be defined at a predetermined radius 348 from a particular geographic point 349. For example, geographic point 349 may be chosen as a point that is an average distance between home 342, coffee shop 344, and 346 (e.g., by a least squares method). Predetermined radius 348, in some embodiments, may be any length suitable to encompass the geographic boundaries of a user's normal routine. Any suitable subset of expected zone 340, moreover, may be designated as a trusted zone using any suitable method.

A user may not always follow the same routine. Accordingly, in those situations it would be useful to determine potential expected zones based on other trustworthy information sources. According to some embodiments, electronic device 101 can have access to a user's calendar (e.g., calendar 120 of FIG. 1) and/or social network (e.g., social network 122 of FIG. 1) data. Based on data from those sources, electronic device 101 may be able to dynamically create expected zones based on at least one of a geographic location and time duration associated with a particular calendar or social network entry. Any expected zone, no matter how it is established, can be stored in expected zone database 124.

Figure 4:
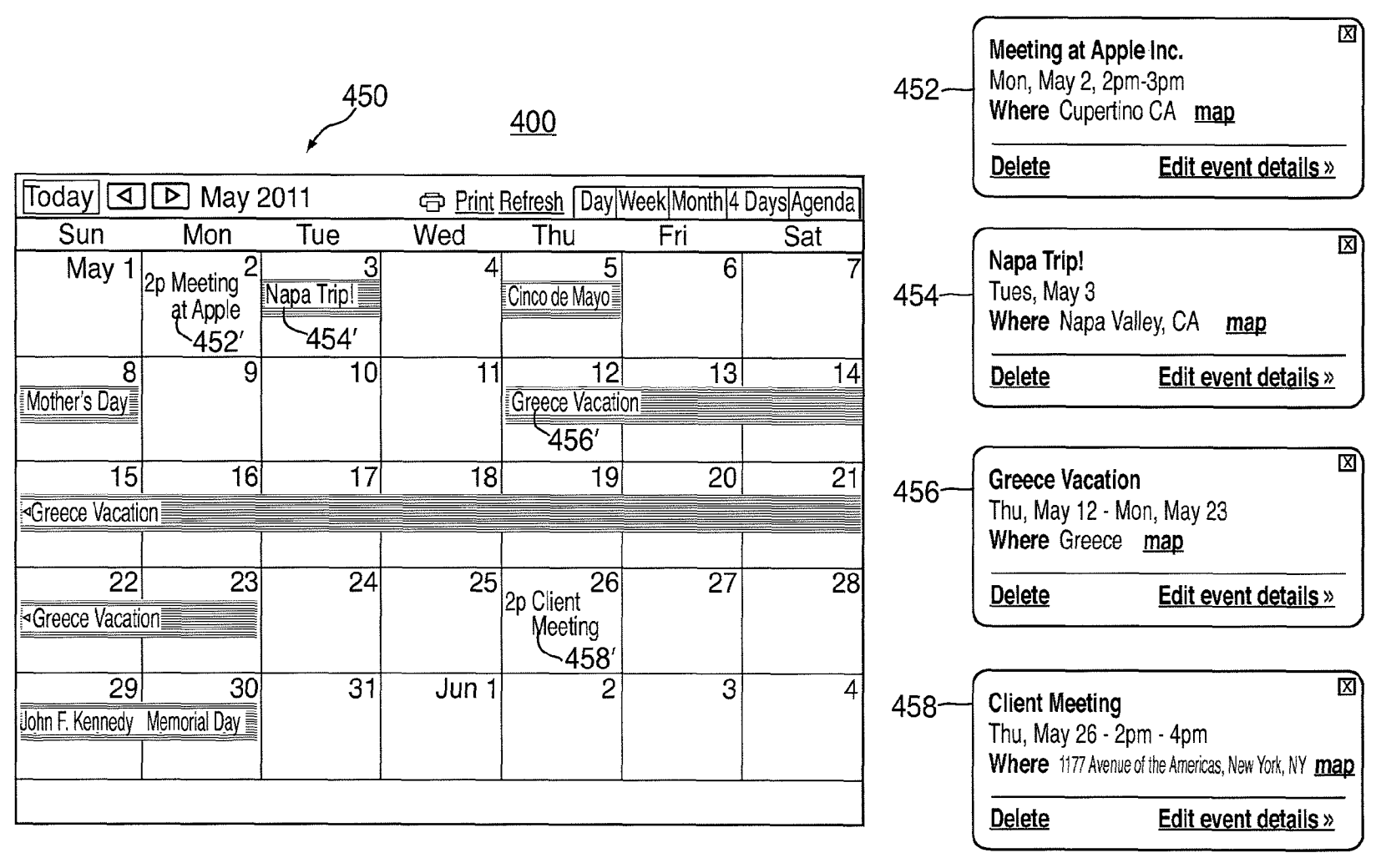

FIG. 4 shows an illustrative calendar based system 400 for defining expected zones according to at least one embodiment. Calendar 450 may be configured to retain information regarding a user's past and future scheduled events. For example, a user can define a series of calendar event entries 452, 454, 456, and 458 that include at least geographic and temporal information. Corresponding calendar event detail views 452', 454', 456', and 458' can generally allow a user to view all or some of the pertinent information regarding each entry on calendar 450. Data associated with calendar 450 may be stored on the electronic device (e.g., in memory 106 or storage 116 of FIG. 1) and/or in a remote database. In some embodiments, calendar event entries may be edited on the electronic device itself, or if the calendar data is stored remotely, from any suitable network-enabled device.

The amount of detail provided in each calendar entry may determine the geographic and temporal boundaries of an expected zone based on the entry. For example, calendar event detail view 452 displays information about a meeting at Apple Inc. on Monday, May 2, 2011 from 2 pm-3 pm in Cupertino, Calif. Based on that information, an electronic device (e.g., electronic device 101 of FIG. 1) could define an expected zone within the geographic boundaries of Cupertino, Calif. for the hours of 2 pm-3 pm on May 2, 2011. Calendar event detail views 454 and 456 represent less detailed calendar entries. For example, calendar event detail view 454 indicates that the user will be somewhere in the Napa Valley on Tuesday, May 3, 2011. A possible expected zone based on that entry could, therefore, encompass all of Napa Valley and extend throughout the entire day. In some embodiments, electronic device 101 may prompt user to decide whether to define the expected zone as, for example, the entire Napa Valley, Napa County, or the city of Napa, Calif. Based upon calendar event entry 456, electronic device 101 could create an expected zone throughout Greece for the dates of Thursday, May 12-Monday, May 23.

In general, it may be desirable to increase security for electronic device 101 by defining an expected zone to be the smallest geographic and temporal zone possible based upon the calendar event entry. In some embodiments, the more information a user supplies for a particular calendar entry, the more useful the resultant expected zone may generally be. For example, a user may be able to import an entire travel itinerary into calendar 450. In that case, an expected zone may be defined for all geographic areas along the travel route for a particular period of time.

Data from a user's social networks may also, in some embodiments, be used to define expected zones for an electronic device. Social networks such as Facebook, Myspace, Foursquare, Classmates.com, LinkedIn, and Twitter give users and users' "friends" the opportunity to share data over a network using an electronic device (e.g., electronic device 101 of FIG. 1). As one example, some social network sites allow a user or a user's friend to "check-in" the user at a particular location. When a user of a particular device confirms the "check-in," an expected zone may be established at that location for a period of time (e.g., a predetermined length of time or until the user leaves that location).

As another example, if a user uploads data to a social networking site the image may include time and location metadata (data about the image), which can then be used to define an expected zone. Some social networks allow users to "tag" other people in a particular image. Generally, that process involves identifying a person in the image and linking the image to their social network profile. Combined with the image metadata, a tagged image may be used to determine a user's expected zone. For example, if a user is tagged in an image that is uploaded to a social network along with geographic and temporal metadata, an expected zone can be created at that place and time for the tagged user. In some embodiments, facial recognition software may be incorporated into the application used to capture the image or into the social networking software that can determine who is in a particular image. The social network may then set up an expected zone for the electronic device associated with each user identified in the uploaded image. The foregoing are only some examples of ways in which social networks may be used to determine an expected zone for a particular electronic device. Generally, any suitable feature from a social network that can confirm the location of a particular user may be used to define an expected zone.

In some embodiments, a change to the user's calendar or social network can automatically define one or more new expected zones. For example, if a user adds a new entry to his or her calendar, that information can be processed by, for example, processing module 102 of FIG. 1, and added to expected zone database 124. Likewise, in some embodiments, a change to user's social network can result in a new expected zone to be added to expected zone database 124. In some embodiments, a user may be given the option to allow electronic device 101 to define an expected zone each time a new entry is added to the user's calendar.

FIGS. 5A-D are various illustrative screen shots of an electronic device 500 according to some embodiments. Electronic device 500 may correspond, for example, to electronic device 101 of FIG. 1. In some embodiments, electronic device 500 may include a display screen 512, which, in the case that display screen 512 is a touch-sensitive screen, can correspond to at least part of input component 110 and at least part of output component 112 of FIG. 1. Electronic device 500 can also include an input component 510, which can also correspond to at least part of input component 110 of FIG. 1.

Figure 5A:
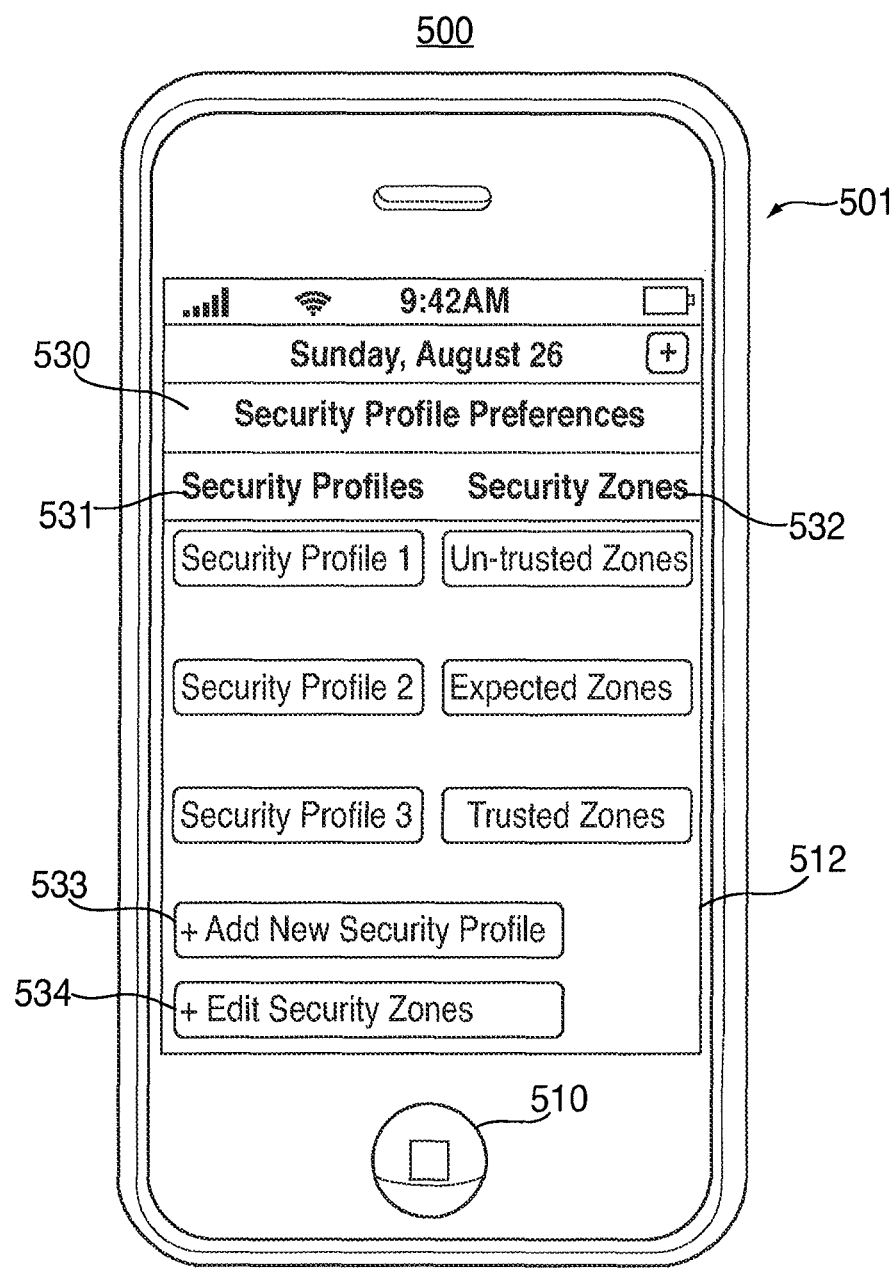
FIGS. 5A-D are illustrative screen shots of an electronic device in accordance with various embodiments.

FIG. 5A is a schematic view of electronic device 500 with a Security Profile Preferences interface 530 shown on display screen 514 according to some embodiments. Security Profile Preferences interface 530 may include a list of defined Security Profiles 531, a corresponding list of defined Security Zones 532, an Add New Security Profile option 533, and an Edit Security Zones option 534.

Each security profile can generally include access provisions for one or more features or applications available on the electronic device. For example, a security profile can define whether user authentication is required for a particular feature or application and, if so, what type of authentication is required. A typical security profile can also define the number of invalid authentication attempts that a user may try before the device takes some predetermined action. For example, upon reaching the maximum number of invalid authorization attempts, the device may enter a reduced functionality mode.

Each security profile can be associated with a particular security zone. Each security zone can be an expected zone, a trusted zone, or groups of expected or trusted zones. An "un-trusted security zone" can also be defined for all zones that do not correspond to any expected zones defined in expected zone database 124.

Each security profile contained in Security Profiles 531 can be selected (e.g., by touching display screen 512) to allow a user to edit the details of that security profile. For example, if a user selects 'Security Profile 1,' display screen 512 of FIG. 5B may be displayed on electronic device 500. Likewise, choosing 'Security Profile 2' or 'Security Profile 3' can result in display screen 512 of FIG. 5C or FIG. 5D, respectively, being displayed on electronic device 500. In some embodiments, Security Zones 532 can be a list of defined security zones that a user can match to each defined security profile. For example, each item in list of defined Security Zones 532 can be a pull-down menu of all available security zone definitions. A user can choose a particular defined security zone from the list to correspond to a particular security profile in a list of defined Security Profiles 531. Option 533 can allow a user to define a new security profile and option 534 can allow a user to edit existing security zone definitions.

Figure 5B:
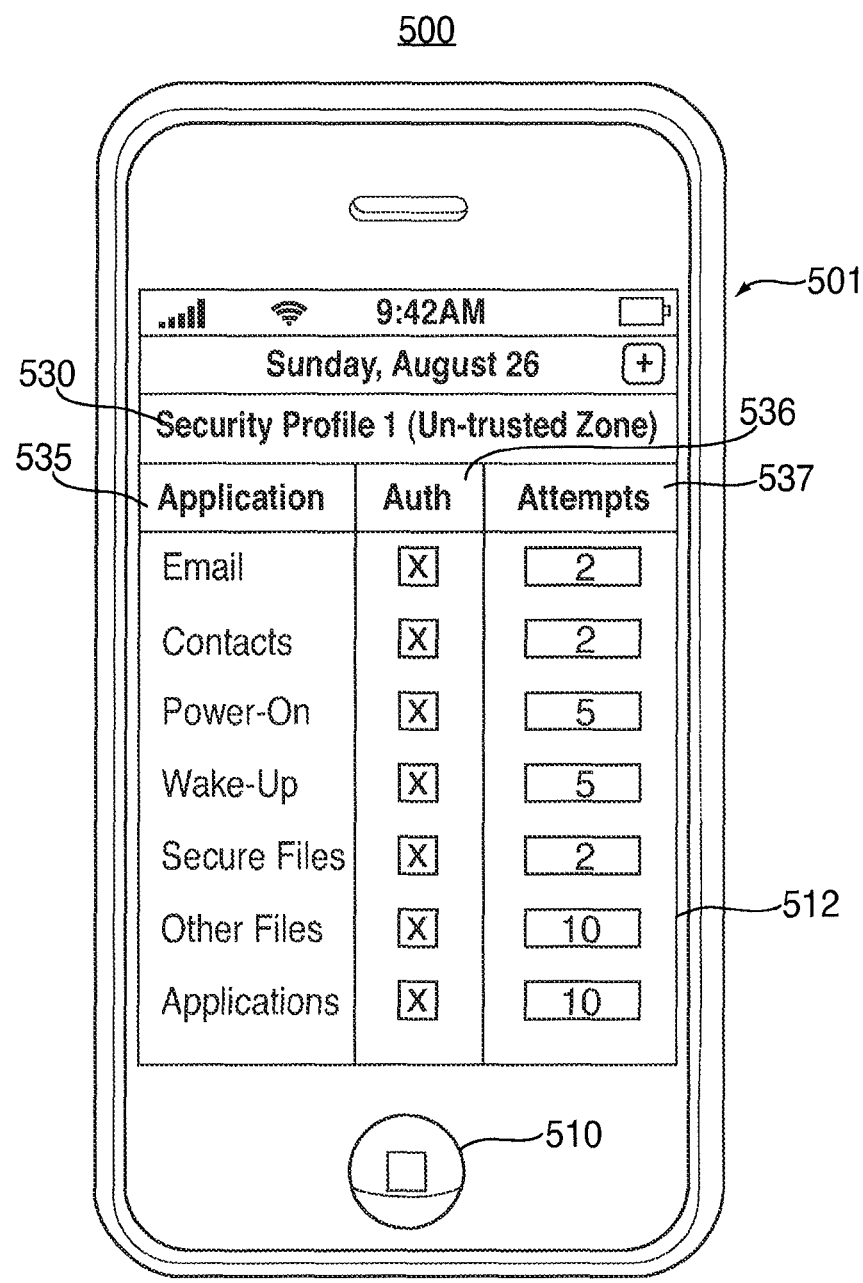

FIG. 5B is illustrative screen shot of electronic device 500 with an exemplary Security Profile 1 interface 230 shown on display screen 512 according to some embodiments. Security Profile 1 interface 530 may include a table with at least three columns: an Application column 535, an Authentication ("Auth") column 536, and an Attempts column 537. Each row of the table may generally represent a single set of security preferences for a feature, application, or group of applications. Application column 535 contains seven entries (i.e., Email, Contacts, Power-On, Wake-Up, Secure Files, Other Files, and Applications); however, that list is for the purposes of example only, other embodiments may contain more, fewer, and/or different entries. Authentication column 536 can, in some embodiments, define whether the corresponding feature or application in column 535 will require user authentication in that particular security profile (in this example, Security Profile 1). Any suitable method for authenticating a user may be implemented for each feature or application, including, but not limited to, one or more passcodes, pin numbers, or biometric indicators, such as fingerprint scans, voice recognition, retinal scans, etc. In the case of Security Profile 1, which may in some embodiments be considered a "high security" profile, all features and applications require authentication. In some embodiments, a high security profile may require a stronger authentication method than a "lower security" profile. For example, a high security profile may require a longer or stronger passcode, and/or combinations or one or more of the authentication methods listed above. A high security profile may be appropriate when electronic device 500 is outside of an expected zone.

Further, attempts column 537 may be included in some embodiments. Column 537 may be used to define a number of permissible invalid authentication attempts. Upon reaching the number of invalid attempts allowed for a particular feature or application, the electronic device can enter a reduced functionality mode. In a reduced functionality mode, the electronic device can take any suitable measures, including, but not limited to, notifying a network administrator of a possible security breach, notifying a user of a possible security breach, powering down the device, putting the electronic device into a heightened security mode (e.g., a "high security" profile), restricting access to the feature or application for a predetermined period of time, or other suitable measure.

Figure 5C:
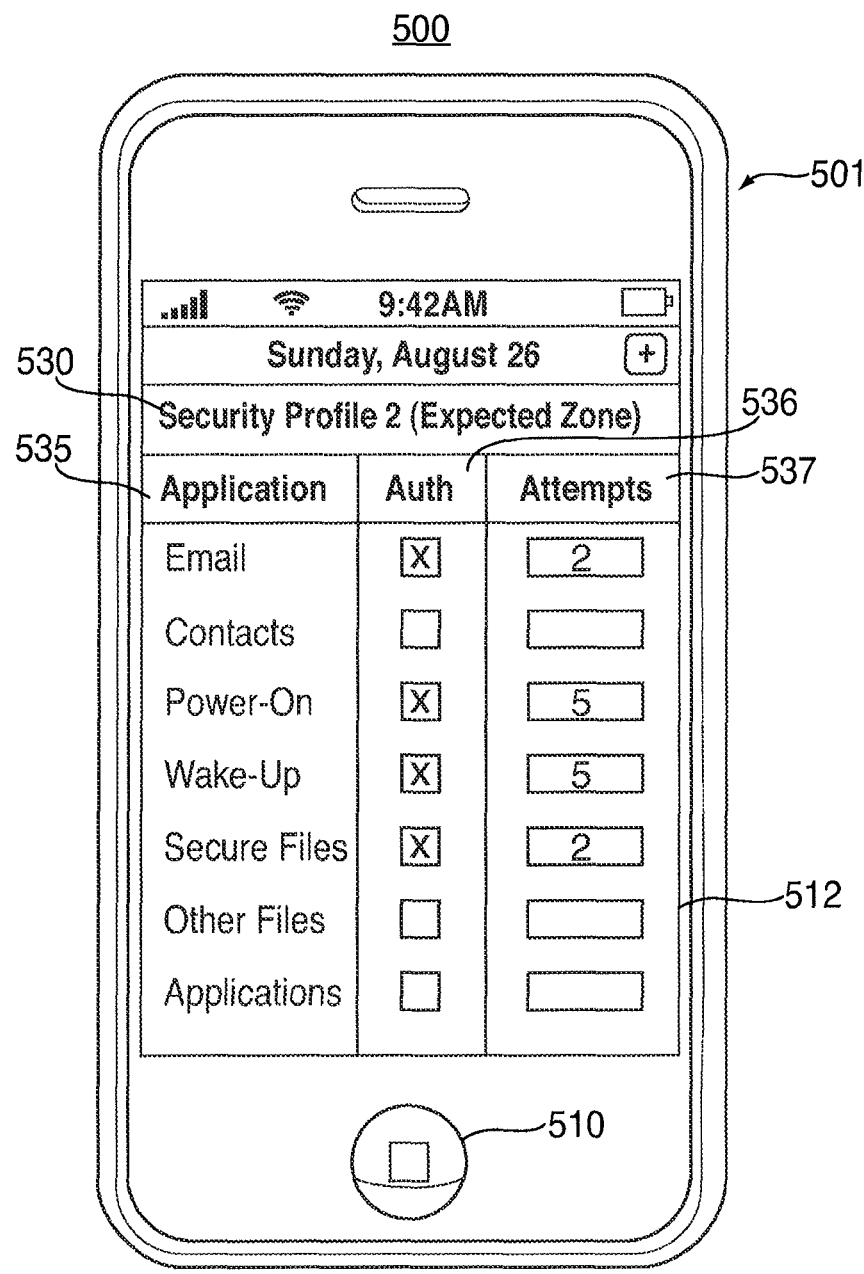

FIG. 5C is a schematic view of electronic device 500 with an exemplary Security Profile 2 interface 530 shown on display screen 512 according to some embodiments. Interface 230 for Security Profile 2 may be generally referred to as a "medium security" profile. For example, Security Profile 2 only requires authentication for Power-On, Wake-Up, and access to the user's Email and secure files. The permissible number of invalid authentication attempts in column 537 may also be increased. Security Profile 2 may be useful, for example, when a user can be fairly confident that the device is not being used by an unauthorized person. In that case, access to non-confidential files, applications, and contacts may be given freely without the user having to provide frequent or more stringent authentication. For example, if a passcode and retinal scan is required for access to secure files in a high security profile, a medium security profile may only require a passcode. A medium security profile like Security Profile 2 may be appropriate when the device is in an expected zone.

Figure 5D:
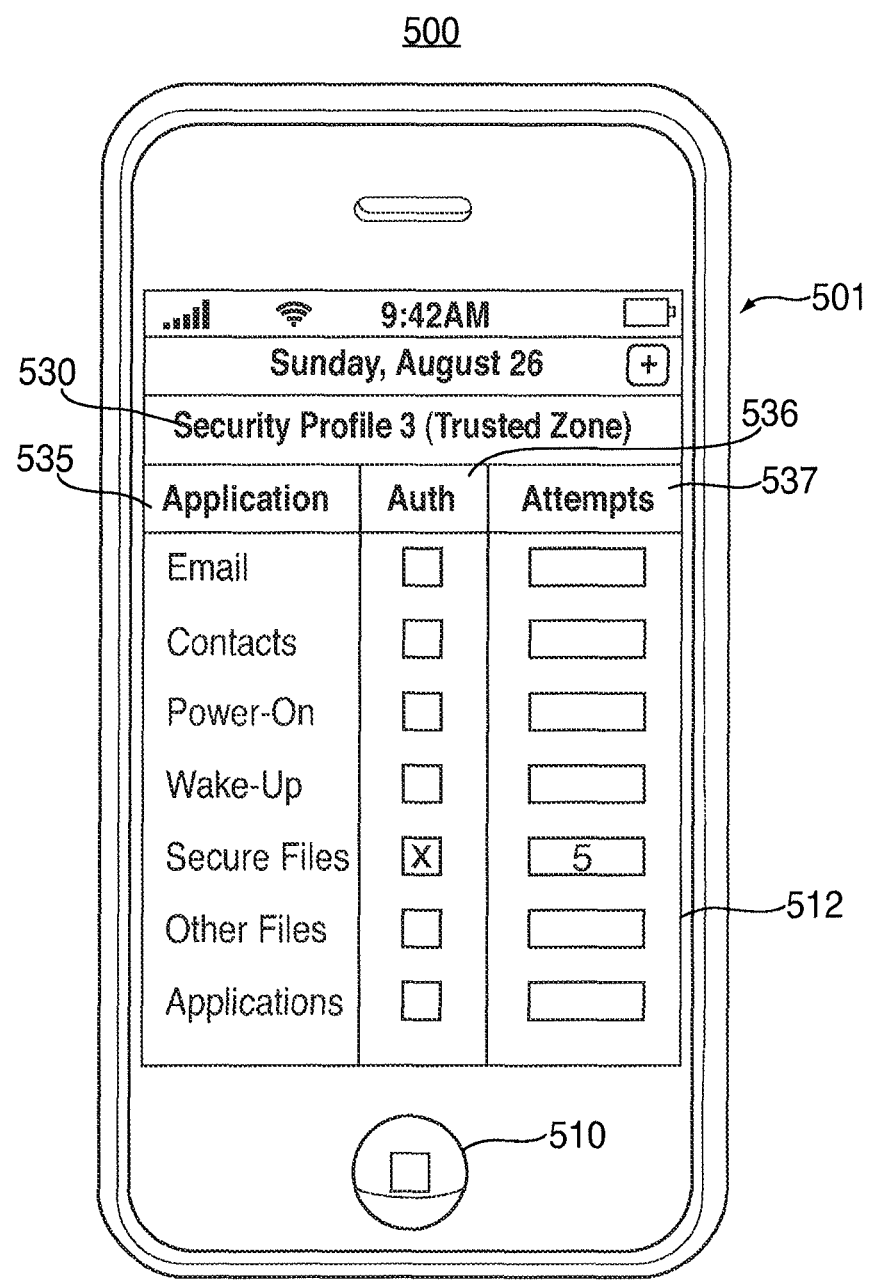

FIG. 5D is a schematic view of electronic device 500 with an exemplary Security Profile 3 interface 530 shown on display screen 512 according to some embodiments. Interface 530 for Security Profile 3 may be generally referred to as a "low security" profile. For example, Security Profile 3 only requires authentication for access to the user's secure files. Security Profile 3 may be useful, for example, when a user can be highly confident that the device is not being used by an unauthorized person. In that case, even access to the user's email may be given freely without the user having to take the time to authenticate himself or herself. In some embodiments, when authentication is required to access a particular feature or application in a low security profile, a weaker authentication method than that used in a high or medium security profile may satisfy the authorization threshold of the low security profile. For example, if a passcode is required for access to secure files in a medium security profile, a lower security profile may require a shorter or weaker passcode. A "low security" profile like Security Profile 3 may be appropriate when the device is in a trusted zone (e.g., a user's home or office).

Figure 6:
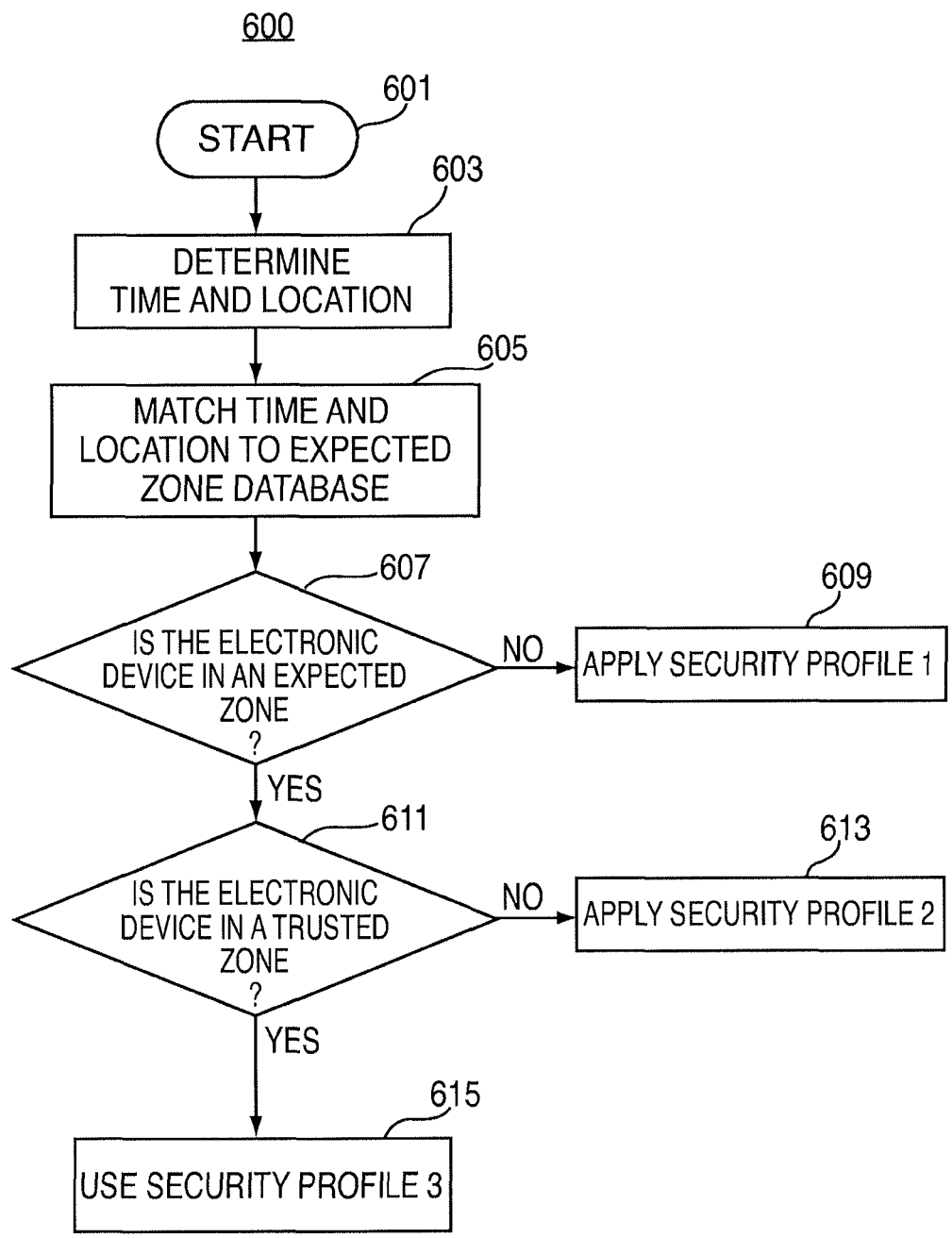
FIG. 6 is flowchart of an illustrative method for supporting various adaptive security profiles according to at least one embodiment.

FIG. 6 is a flowchart of an illustrative method 600 for supporting various adaptive security profiles according to at least one embodiment. The method can start at step 601 and proceed to step 603 in which the device can determine the current time and location (e.g., with location module 104). Next, at step 605, the electronic device can compare the determined time and location data to expected zone entries in an expected zone database (e.g., expected zone database 124). Expected zone database 124 may be available locally on electronic device 101 (e.g., in memory 106 and/or storage 116). In some embodiments, an expected zones database may also be available remotely. In those embodiments, communication module 108 may be employed to read from and write data to the remote expected zones database. The location, as determined by location module 104 can then be compared expected zone database 124. The comparison may be effected by adaptive processing module 114. "Location" can generally refer to a geographic location (e.g., as determined by a GPS) or a location determined by association with a particular network or soundscape.

At step 607, an electronic device can determine whether or not it is in an expected zone. If electronic device 101 is not within the boundaries of one or more expected zones electronic device 101 may, at step 609, apply security profile 1. Security profile 1 may be, for instance, the security profile shown on display screen 512 of FIG. 5B. In the case that security profile 1 corresponds to a determination that electronic device 101 is not in an expected zone, security profile 1 may be, for example, a "high security" profile.

In the event that electronic device 101 is in an expected zone at step 607, the method may continue to step 611. In step 611, electronic device 101 may determine whether or not it is in a trusted zone. Trusted zone definitions may be stored in the same database as the expected zone definitions, or they may be stored separately (e.g., in memory 106, storage 116, or in a remote database). In general, trusted zones can be a subset of defined expected zones. In other words, all trusted can be considered expected zones, but not vice-versa. The geographic location of electronic device 101, as determined by location module 104, can be compared against the expected zone database, for example, using adaptive security module 114. If electronic device is not a trusted zone, electronic device 101 may apply security profile 2 at step 613. According to some embodiments, security profile 3 may correspond to the security profile shown on display screen 512 of FIG. 5C. Security profile 2 may be considered a "medium security" profile and could be appropriate when electronic device 101 is in an expected zone but not a trusted zone. If electronic device 101 is in a trusted zone, electronic device 101 may apply security profile 3 at step 615. According to some embodiments, security profile 3 may correspond to the security profile shown on display screen 214 of FIG. 2D. Security profile 3 may be considered a "low security" profile and could be appropriate when electronic device 101 is in a trusted zone (e.g., a user's home).

Security profiles 1-3 associated with method 600 are listed for purposes of example only. A user may define any number of security profiles. Certain security profiles may have default provisions for some or all of the applications and features associated with the profile. For example, the security profile corresponding to an expected zone security zone may contain the access provisions listed in security profile interface 530 of FIG. 5C. In some embodiments, a user can edit the default security profiles. Alternatively, each security profile may be fully or partially user-defined.

It is to be understood that the steps shown in method 600 of FIG. 6 are merely illustrative and that existing steps may be modified or omitted, additional steps may be added, and the order of certain steps may be altered.

Figure 7:
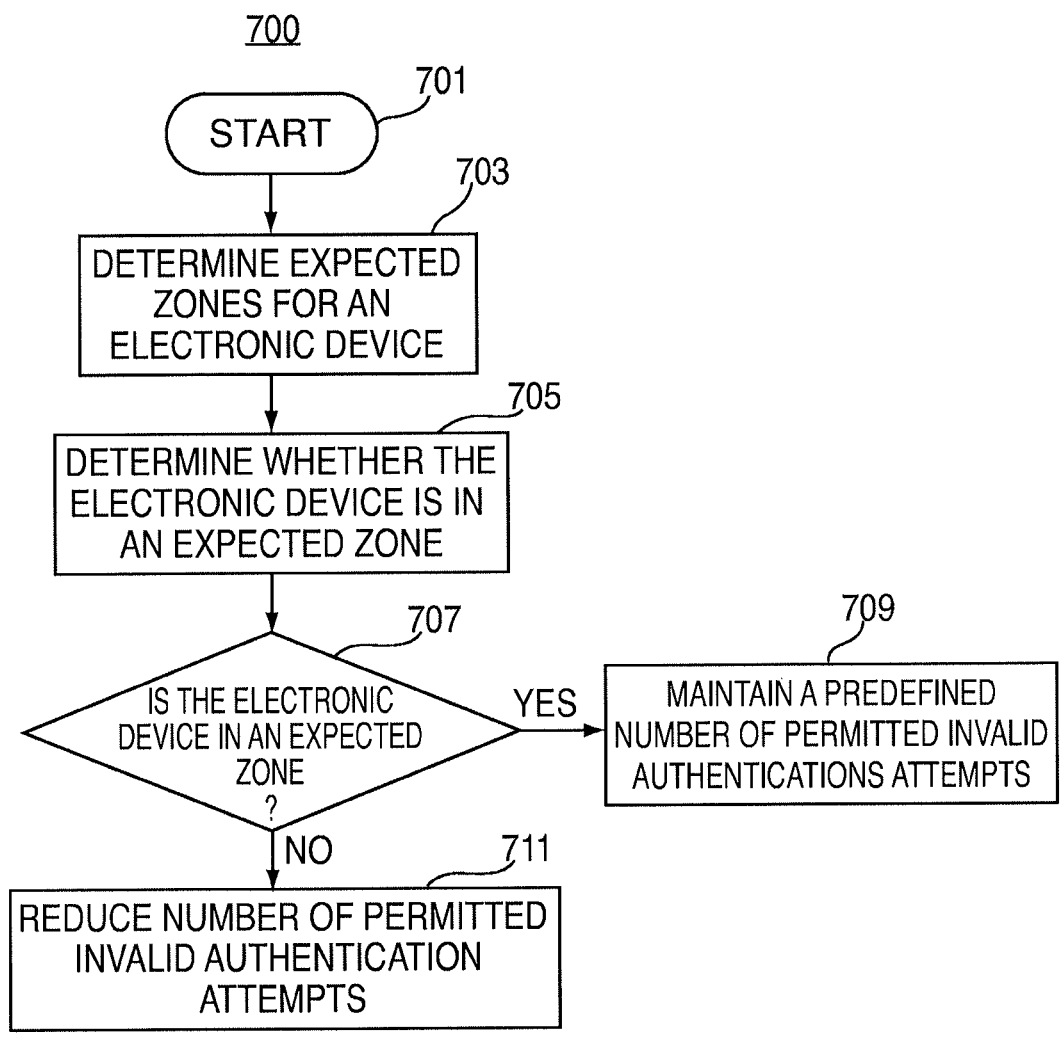
FIG. 7 is a flowchart of an illustrative method for supporting various adaptive security profiles according to at least one embodiment.

FIG. 7 is a flowchart of an illustrative method 700 for supporting various adaptive security profiles according to at least one embodiment. The method can adaptively vary the number of permitted invalid authentication attempts required to access certain features, functions, or applications on an electronic device. Method 700 can begin at step 701 and proceed to step 703, which can determine expected zones for an electronic device. Expected zones can be maintained in an expected zone database (e.g., expected zone database 124). The method can then proceed to step 705 which can determine whether the electronic device is in an expected zone.

Next at 707, if the electronic device is in an expected zone, method 700 can proceed to step 709 and maintain a predefined number of permitted invalid authentication attempts. However, if at step 707 the electronic device is not in an expected zone the electronic device can proceed to step 711 and reduce the number of permitted invalid authentication attempts that a user can try before the device takes some predetermined action. For example, the reduced number of permitted invalid authentication attempts may, according to some embodiments, apply to accessing one or more features or functions of the electronic device or powering-on the device.

Upon reaching the maximum number of invalid authorization attempts, the device may enter a reduced functionality mode as part of an increase security profile. In a reduced functionality mode, the electronic device can take any suitable measures, including, but not limited to, notifying a network administrator of a possible security breach, notifying a user of a possible security breach, powering down the device, disabling the device, or putting the electronic device into a heightened security mode (e.g., a "high security" profile), restricting access to the feature or application for a predetermined period of time, or other suitable measure.

It is to be understood that the steps shown in method 600 of FIG. 7 are merely illustrative and that existing steps may be modified or omitted, additional steps may be added, and the order of certain steps may be altered.

While there have been described systems and methods for supporting various adaptive security profiles on an electronic device, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for adjusting a security profile of an electronic device comprising:
maintaining a database that defines one or more expected zones in which the electronic device may be located;
receiving, via an input of the electronic device, a request to access the electronic device;
automatically determining a current location of the electronic device;
determining whether the current location is located in one or more of the expected zones defined by the database; and
implementing, on the electronic device, a first security profile requiring a first authentication process when the electronic device is located in an expected zone defined by the database, and a second security rule requiring a second authentication process when the electronic device is located outside of any expected zones defined by the database,
wherein the first authentication process authenticates a first set of user inputs that comprises entry of at least one of a first touch input on a touch-sensitive display of the electronic device, pin number, passcode, and biometric indicator, and
the second authentication process authenticates a second set of user inputs that comprises entry of at least one of a second touch input on the touch-sensitive display of the electronic device, pin number, passcode, and biometric indicator, and the second set of user inputs is different from the first set of user inputs.

2. The method of claim 1, comprising automatically updating the database to define one or more expected zones.

3. The method of claim 1, wherein one or more expected zones defined by the database are based at least on a determination of a user's routine.

4. The method of claim 1, comprising automatically sampling the electronic device's location and defining one or more expected zones in the database based on patterns of the automatically sampling of the electronic device's location.

5. The method of claim 1, comprising prompting the user with questions that are used to define one or more expected zones into the database.

6. The method of claim 1, wherein the current location of the electronic device is determined using a global positioning system (GPS) receiver.

7. The method of claim 1, wherein the current location of the electronic device is determined using measurements of a network signal associated with the electronic device.

8. The method of claim 1, wherein the current location of the electronic device is determined based on a wireless network or access point that is in range of the electronic device or based on a wireless network or access point to which the electronic device is currently connected.

9. The method of claim 1, comprising maintaining a database that defines one or more trusted zones in which the electronic device may be located and implementing a third security profile when the electronic device is located in a trusted zone.

10. The method of claim 1, wherein the first security profile is associated with a particular expected zone.

11. The method of claim 1, wherein the first security profile is associated with a group of expected zones.

12. The method of claim 1, wherein the second set of user inputs include the first set of user inputs and at least one additional user input.

13. The method of claim 1, wherein a database entry that defines an expected zone comprises geographical and temporal boundaries.

14. An electronic device with an ability to adjust a security profile, the device comprising:
a user interface configured to receive a request to access the electronic device;
a memory storing a database that defines one or more expected zones in which the electronic device may be located; and
a computer processor configured to:
automatically obtain a current location of the electronic device;
determine whether the current location is located in one or more of the expected zones defined by the database; and
implement, on the electronic device, a first security profile requiring a first authentication process when the electronic device is located in an expected zone defined by the database, and a second security rule requiring a second authentication process when the electronic device is located outside of any expected zones defined by the database,
wherein the first authentication process authenticates a first set of user inputs that comprises entry of at least one of a first touch input on a touch-sensitive display of the electronic device, pin number, passcode, and biometric indicator, and
the second authentication process authenticates a second set of user inputs that comprises entry of at least one of a second touch input on the touch-sensitive display of the electronic device, pin number, passcode, and biometric indicator, and the second set of user inputs is different from the first set of user inputs.

15. The device of claim 14, wherein at least one expected zone in the database is automatically defined by the electronic device.

16. The device of claim 14, wherein at least one expected zone defined by the database is based at least on a determination of a user's routine.

17. The device of claim 14, wherein the processor is configured to automatically sample the electronic device's location and defining one or more expected zones in the database based on patterns of the automatic sampling of the electronic device's location.

18. The device of claim 14, wherein the device is configured to prompt the user with questions that are used to define one or more expected zones in the database.

19. The device of claim 14, wherein the current location of the electronic device is determined using a global positioning system (GPS) receiver.

20. The device of claim 14, wherein the current location of the electronic device is determined using measurements of a network signal associated with the electronic device.

21. The device of claim 14, wherein the current location of the electronic device is determined based on a wireless network or access point that is in range of the electronic device or based on a wireless network or access point to which the electronic device is currently connected.

22. The device of claim 14, wherein the memory further stores a database defining one or more trusted zones in which the electronic device may be located and implementing a third security profile when the electronic device is located in a trusted zone.

23. The device of claim 14, wherein the first security profile is associated with a particular expected zone.

24. The device of claim 14, wherein the first security profile is associated with a group of expected zones.

25. The device of claim 14, wherein the second set of user inputs include the first set of user inputs and at least one additional user input.

26. The device of claim 14, wherein a database entry defining an expected zone comprises geographical and temporal boundaries.

27. A non-transitory computer readable storage medium storing one or more programs, the one or more programs comprising instructions, which when executed by an electronic device with a computer processor, cause the electronic device to:
 maintain a database that defines one or more expected zones in which the electronic device may be located;
 receive, via an input of the electronic device, a request to access the electronic device;
 automatically obtain a current location of the electronic device;
 determine whether the current location is located in one or more of the expected zones defined by the database; and
 implement, on the electronic device, a first security profile requiring a first authentication process when the electronic device is located in an expected zone defined by the database, and a second security rule requiring a second authentication process when the electronic device is located outside of any expected zones defined by the database,
 wherein the first authentication process authenticates a first set of user inputs that comprises entry of at least one of a first touch input on a touch-sensitive display of the electronic device, pin number, passcode, and biometric indicator, and
 the second authentication process authenticates a second set of user inputs that comprises entry of at least one of a second touch input on the touch-sensitive display of the electronic device, pin number, passcode, and biometric indicator, and the second set of user inputs is different from the first set of user inputs.

28. The storage medium of claim 27, wherein at least one expected zone in the database is automatically defined by the electronic device.

29. The storage medium of claim 27, wherein at least one expected zone defined by the database is based at least on a determination of a user's routine.

30. The storage medium of claim 27, wherein the one or more programs further cause the electronic device to automatically sample the electronic device's location and define one or more expected zones in the database based on patterns of the automatic sampling of the electronic device's location.

31. The storage medium of claim 27, wherein the one or more programs further cause the electronic device to prompt the user with questions that are used to define one or more expected zones in the database.

32. The storage medium of claim 27, wherein the current location of the electronic device is determined using a global positioning system (GPS) receiver.

33. The storage medium of claim 27, wherein the current location of the electronic device is determined using measurements of a network signal associated with the electronic device.

34. The storage medium of claim 27, wherein the current location of the electronic device is determined based on a wireless network or access point that is in range of the electronic device or based on a wireless network or access point to which the electronic device is currently connected.

35. The storage medium of claim 27, wherein the one or more programs further cause the electronic device to maintain a further database defining one or more trusted zones in which the electronic device may be located and implementing a third security profile when the electronic device is located in a trusted zone.

36. The storage medium of claim 27, wherein the first security profile is associated with a particular expected zone.

37. The storage medium of claim 27, wherein the first security profile is associated with a group of expected zones.

38. The storage medium of claim 27, wherein the second set of user inputs include the first set of user inputs and at least one additional user input.

39. The storage medium of claim 27, wherein a database entry defining an expected zone comprises geographical and temporal boundaries.

* * * * *